Figure 1:
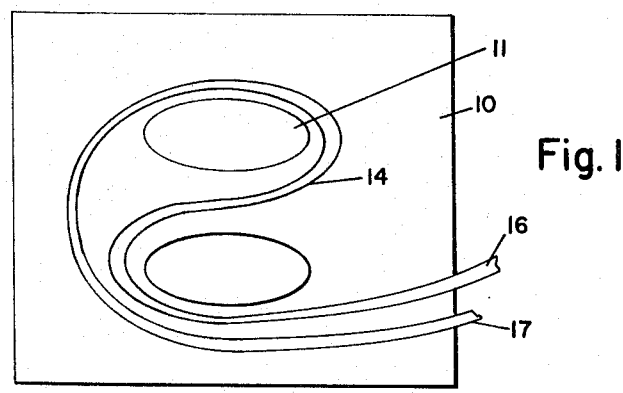

Jan. 24, 1967     V. F. DAHLGREN ETAL     3,300,572

EXTENSIBLE AND RETRACTABLE FLEXIBLE CIRCUIT CABLE

Original Filed Sept. 23, 1960

VICTOR F. DAHLGREN
SIDNEY K. TALLY
        INVENTORS

Robert O. Richardson
        ATTORNEY

United States Patent Office 3,300,572
Patented Jan. 24, 1967

3,300,572
EXTENSIBLE AND RETRACTABLE FLEXIBLE CIRCUIT CABLE
Victor F. Dahlgren, Chelmsford, Mass., and Sidney K. Tally, Nashua, N.H., assignors to Sanders Associates, Inc., Nashua, N.H., a corporation of Delaware
Continuation of application Ser. No. 58,024, Sept. 23, 1960. This application Dec. 18, 1963, Ser. No. 333,256
6 Claims. (Cl. 174—69)

This application is a continuation of our copending application, Serial No. 58,024, filed September 23, 1960, now abandoned.

This invention relates to extensible and retractable flexible circuit cables of the ribbon type and more particularly to an electrical cable consisting of a plurality of thin flat conductors encapsulated in a thermoplastic material and having a preformed reverse coiled configuration through the use of spring properties afforded by the plastic memory.

Heretofore, cables between electrical contacts or terminals have been of a sufficient length that no undue stress or strain is applied to the cable. If the terminals are to have relative movement therebetween, the cable then must be of a length equal to the maximum distance between the two terminals. When the cable's ends are moved inwardly toward each other, such as in a slidable rack mounted unit, the cables would then sag or bunch up in the space afforded between the two terminal ends, which space is less than their maximum distance apart. This entanglement was unsightly, bulky, and consumed space which sometimes was at a premium.

Another prior art arrangement was that of a prestressed flat accordion pleated cable. These cables, while extensible and retractable, would not support themselves during expansion, that is, they would sag. In addition, the restoring force present in the accordion pleat was small. As will be seen from a description of the invention to follow, there is present in the invention a strong restraining force which rewinds the cable of the invention in a compact package on itself.

Other prior art devices utilized for the storage of cables proved to be impractical because of the incorporation of complex expensive and bulky mechanisms to wind and store the cables. These imperfect rewinding mechanisms could not be depended on to provide a constant source of tension to the cable during the expansion and contraction of the cable. Furthermore, these bulky mechanisms take up valuable space behind and in between electronic component drawers, thus limiting the minimum size of the overall component drawer and related cabinets.

Moreover, the capacitance between conductors lying in close proximity would of necessity become varied, setting up a change in electrical characteristics of the line and creating possible electrical disturbances.

It is important to note that the weight in the middle of such a prior art arrangement, caused by the inherent weight of the cable housing and mechanism, causes this expanded assembly to sag in the middle and complicate rewind. Utilization of the invention to be described herein presents a compact cable arrangement which can, when expanded, present a central loading at the middle that constantly decreases until this weight at the center is only the weight of the cable. This arrangement provides a self-supporting construction which greatly enhances usefulness of the expandable and retractable cable.

All of the above disadvantages have been overcome in the present device, which has been made from a length of spaced electrical conductors encapsulated in a thin strip of flexible thermoplastic material, currently marketed under the name of Flexprint, a registered trademark of Sanders Associates, Incorporated. These flexible circuit conductors are currently being made by bonding a sheet of cupric oxide coated copper foil to a flexible thermoplastic base sheet, etching away undesired portions to obtain a circuit path, and applying a top cover to the remaining circuit path and the exposed plastic surface under heat and pressure to encapsulate the conductors in predetermined spaced relationship. The base sheet and covering are not limited to but may include sheets of polymonochlorotrifluoroethylene, commercially obtained under the trade name of Kel-F, a trademark of Minnesota Mining and Manufacturing Company, or polytetrafluoroethylene, commercially available as Teflon, a trademark of Du Pont. It has been found that the thermoplastic materials used have a memory characteristic such that they may be preformed, and when possible the material will then return to its preformed state. It is therefore possible to roll this material up into a roll, and accomplish the desired prestressing to give to the material the desired configuration. In the present instance, it is desired to roll the connecting strips into a small roll such that it may be stretched out into an extended position when desired and upon release will recoil into the original preformed roll.

The above-described preformed small roll greatly enhances the packaging ability of this expandable cable over prior art bulky mechanical contrivances noted earlier as cable storage units. As can be readily seen, the small preformed roll acts as its own rewind mechanism, thereby avoiding the need for a support housing and winding mechanism. The above arrangement provides for linear tension during the expansion and contraction of the cable, thereby providing relatively constant tension to cable end electrical connection as distinguished from spring wound cable storage units whose tension increases as the cable is withdrawn. This places greater tension on the cable end terminal, which may result in eventual structural fatigue breakage of the end terminals.

It is therefore an object of the present invention to provide for an extensible and retractable flexible circuit cable of the ribbon type which will extend to the desired amount between spaced terminals and which will retract to the extent that the cable will always be at the desired length.

Another object is the provision of a circuit cable of the ribbon type having a coiled configuration such that it may be extended as desired to make connections between two terminals.

Figure 2:
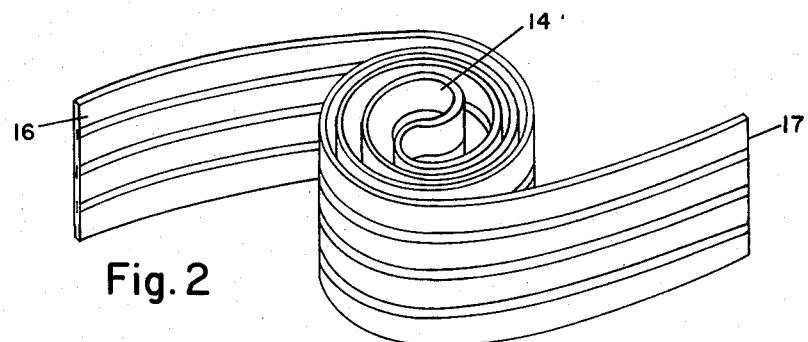
Figure 3:
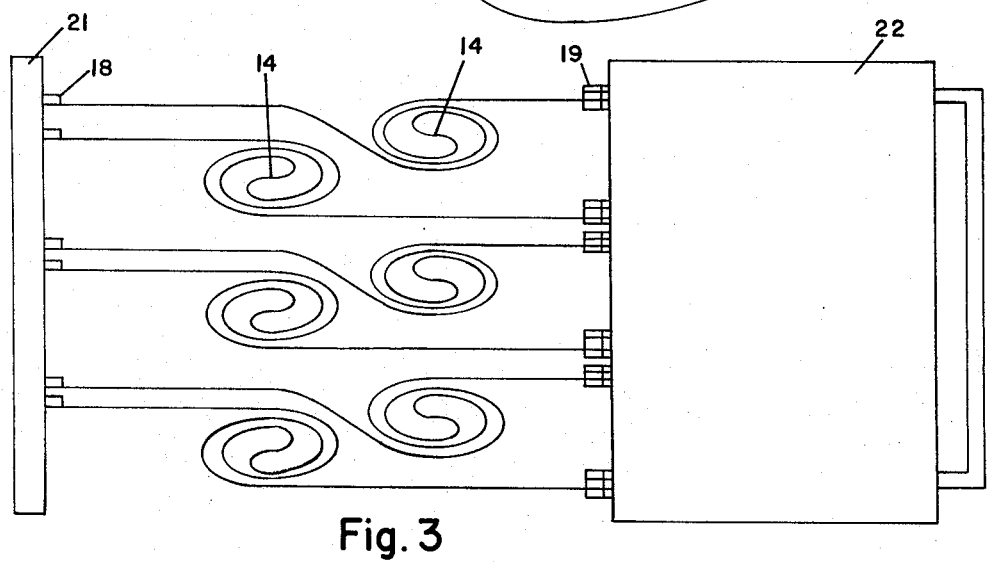

These and other objects which overcome the deficiencies of the prior art will become more apparent as the description of the present invention proceeds with reference to the drawings wherein, FIG. 1 shows a ribbon type cable assembled over a jig prior to forming the cable in a coiled configuration, FIG. 2 is a perspective view of the cable, and FIG. 3 is a plan view showing a plurality of cable strips in use.

Referring now to FIG. 1, there is shown a base 10 having a pair of upstanding posts 11 having an elliptical cross sectional configuration. These posts are of a height slightly more than the width of the cable being formed. A strip of flexible printed circuitry more fully disclosed in Patent No. 2,997,521, filed April 2, 1960, and issued August 22, 1961, is placed therebetween at its midpoint 14. Since this strip is of flexible material, it is then wrapped around these posts or jig throughout the entire length of the cable. It should be noted that both halves of the cable wrap around the posts in the same direction. Suitable pressure is applied to hold the coil in a taut position and to give the material a prestressed direction. The cable is then placed in an oven which is maintained at approximately 150° C. and heated in this position for approximately four minutes or until saturation to oven temperature is accomplished. It is then permitted to cool to room temperature at a rate dependent upon the spring tension desired: the slower the cooling, the greater the tension. Thereafter, it is removed from the jig and appears as shown in FIG. 2, ready for use. When ready for use, the ends 16 and 17 of the conducting strips are then "bared" sufficiently to obtain electrical contact with the terminals of the equipment or apparatus involved, and suitable electrical connections are made. The cable has sufficient resiliency that elongation may occur when the ends are moved apart with a resulting unwinding of the coil about a central axis of revolution at the point 14 where the reverse point appears. The cable possesses the necessary spring-like qualities to retract when the ends are permitted to move closer together.

The above noted process has the highly desirable end result of producing a cable wound on itself which presents an inherently self-supporting structural arrangement. When the cable is fully extended it maintains itself substantially in the plane of elongation throughout its unwinding and rewinding, thereby forming by itself an expandable and retractable circuit cable unit.

It is to be understood that many modifications are possible within the scope of the appended claims, and the above description is of a preferred embodiment; but the invention is not to be construed as limited thereto. For example, the cable may be wound on a slotted piece of pipe by rotating the pipe instead of wrapping the cable around the pipe. Also, after heating the cable, it may be preferable to quench it in cold water instead of gradually cooling to room temperature. Also, by using other than mid-point of the cable as the center for coiling operation, a plurality of cables may be used in a very compact area, as shown in FIG. 3, wherein terminals 18 and 19 are connected to the rear wall 21 and a sliding drawer 22 of an electrical cabinet. This compact arrangement as shown in FIG. 3 is enhanced by the location of the cables in a parallel arrangement with the reversed wound coil configurations alternately wound in a clockwise and counterclockwise manner.

What is claimed is:

1. A flexible, extensible and retractable circuit cable consisting of:
   (a) a plurality of electrical conductors spaced apart in the thermoplastic material forming a ribbon type self-supporting cable, said thermoplastic material having a plastic memory characteristic,
   (b) said cable being of a reversed wound coil configuration having a center of revolution and having a prestressed elasticity to permit elongation thereof by the unwinding of the said coil about said center of revolution; said ribbon type cable having a spring-like quality to return it to its original prestressed coil configuration upon release thereof, said spring-like quality being imparted thereto by the prestressed memory characteristic of said thermoplastic material,
   (c) said cable being reversed at a point intermediate its ends with both ends thereof being coiled in the same rotational direction, and
   (d) said cable being adapted for for mounting between relatively movable components.

2. A flexible, extensible and retractable circuit cable consisting of:
   (a) a plurality of conductors spaced apart in thermoplastic material, forming a broad ribbon type cable whose width is greater than its thickness,
   (b) said ribbon type cable being of a reversed wound coil configuration having a central axis of revolution which central axis is parallel to said ribbon type cable's width and at right angles to the length, and having a prestressed elasticity to permit elongation thereof by the unwinding of said coil about said center of revolution and said ribbon type cable returning to its original prestressed coil configuration upon release thereof,
   (c) said ribbon type cable being reversed at a point intermediate its ends, such that both ends thereof are coiled in the same rotational direction,
   (d) said self-supporting cable being mounted between relatively movable components, to electrically interconnect said components, and
   (e) the reversed wound coil configuration and prestressed elasticity of said ribbon type cable cooperating to make said cable self-supporting.

3. A flexible, extensible and retractable self-supporting circuit cable consisting of:
   (a) a plurality of conductors spaced apart in thermoplastic material forming a broad ribbon type cable, said thermoplastic material having a memory characteristic,
   (b) said ribbon type cable being of a reversed wound coil configuration having a central axis of revolution which central axis is parallel to said ribbon type cable's width and at a right angle to the length, said thermoplastic material being treated to permit elongation of said ribbon type cable by application of unwinding forces to said coil to effect unwinding thereof about said center of revolution and the memory characteristic of said treated thermoplastic material causing said ribbon type cable to return to its original prestressed coil configuration upon release of said unwinding forces,
   (c) said ribbon type cable being reversed at a point intermediate its ends, such that both ends thereof are coiled in the same rotational direction, and
   (d) said self-supporting ribbon type cable being mounted between relatively movable components to electrically interconnect said components.

4. A flexible, extensible and retractable self-supporting circuit cable consisting of:
   (a) a multiconductor thermoplastic ribbon type cable having a width greater than its thickness and having a plastic memory characteristic dependent on heat treatment,
   (b) said ribbon type cable wound in a roll so that its ends come out on opposite sides of said roll and in the same plane, and
   (c) said ribbon type cable having been heat treated so that upon an application of tension to said ends, said roll will unwind and upon release of tension said roll will rewind on itself.

5. A flexible, extensible and retractable self-supporting circuit cable consisting of a plurality of electrical conductors spaced apart in thermoplastic material forming a broad ribbon type cable whose width is greater than its thickness, said thermoplastic material having a memory characteristic such that it may be heat treated to establish a preformed configuration to which it will return from subsequent physical distortions, said cable having a rolled configuration such that it is folded back on itself and rolled from its folded end, said cable being treated to set said thermoplastic material in said rolled configuration.

6. A flexible, extensible and retractable circuit cable consisting of:
   (a) a plurality of thin flat electrical conductors spaced apart in thermoplastic material forming a ribbon type self-supporting cable, said thermoplastic material having a plastic memory characteristic,
   (b) said cable being of a reversed wound coil configuration having a center of revolution to permit elongation thereof by the unwinding of said coil about said center of revolution, said ribbon type cable having a springlike quality to return it to its original coil configuration upon release thereof, said spring-like quality being imparted thereto by the plastic memory characteristic of said thermoplastic material, (c) said cable being reversed at a point intermediate its ends with both ends thereof being coiled in the same rotational direction, and
(d) said cable being adapted for mounting between relatively movable components.

References Cited by the Examiner

UNITED STATES PATENTS 2,586,763  2/1952  Judisch _____ 174—69 X

FOREIGN PATENTS 220,001    2/1959  Australia.
1,140,801  3/1957  France.

LEWIS H. MYERS, *Primary Examiner.*

JOHN P. WILDMAN, E. JAMES SAX, ROBERT K. SCHAEFFER, *Examiners.*

D. L. CLAY, *Assistant Examiner.*